United States Patent [19]

Rauscher

[11] 4,328,305

[45] May 4, 1982

[54] SURFACE TREATMENT OF PHOTOTHERMALLY CRYSTALLIZABLE, CHEMICALLY-MACHINABLE GLASS-CERAMIC ARTICLES

[75] Inventor: Herbert E. Rauscher, Painted Post, N.Y.

[73] Assignee: Corning Glass Works, Corning, N.Y.

[21] Appl. No.: 223,579

[22] Filed: Jan. 9, 1981

[51] Int. Cl.$^3$ ............................................. C03B 32/00
[52] U.S. Cl. ..................................... 430/351; 65/30.1; 65/30.13; 65/33; 430/13
[58] Field of Search ....................... 65/30.1, 30.11, 33, 65/30.13; 430/13, 351; 501/5, 69

[56] References Cited

U.S. PATENT DOCUMENTS

| | | | |
|---|---|---|---|
| 1,973,501 | 9/1934 | Murgatroyd | 65/30.1 |
| 2,628,160 | 2/1953 | Stookey | 65/31 X |
| 2,971,853 | 2/1961 | Stookey | 65/33 |
| 3,348,934 | 10/1967 | Hinson et al. | 65/30.1 |
| 3,473,908 | 10/1969 | Snow | 65/30.1 |

*Primary Examiner*—Richard V. Fisher
*Attorney, Agent, or Firm*—Clinton S. Janes, Jr.

[57] ABSTRACT

This invention is directed to a method for treating the surface of photothermally crystallizable chemically-machinable glass-ceramic articles to render them non-sticking when brought into contact with certain organic materials. More particularly, the invention is drawn to the treatment of photothermally crystallizable, chemically-machinable glass-ceramic head pads for use in conjunction with information storage discs with $SO_2$ vapors to render them non-sticking with respect to those discs.

6 Claims, No Drawings

SURFACE TREATMENT OF PHOTOTHERMALLY CRYSTALLIZABLE, CHEMICALLY-MACHINABLE GLASS-CERAMIC ARTICLES

BACKGROUND OF THE INVENTION

The chemical machining or sculpturing of glass articles had its genesis in U.S. Pat. No. 2,628,160. That patent discloses the preparation of photosensitively opacifiable glass articles which, upon being sequentially subjected to ultraviolet radiation and heat treatment, will develop crystals in situ, the identity of those crystals being such as to be much more readily soluble in aqueous hydrofluoric acid than the glass. In practice, the portions of the glass body that are desired to be etched away are exposed to ultraviolet radiation and the rest of the body is masked from the radiation. After exposure, the glass body is heated to a temperature in the vicinity of the softening point thereof to cause the formation of crystallites selected from the group of lithium silicate, barium disilicate, and an alkali metal fluoride. The crystals are many times more rapidly soluble in dilute hydrofluoric acid than is the residual glass.

U.S. Pat. No. 2,971,853 describes the production of glass-ceramic articles which can be chemically machined or sculptured. Such articles are produced from photothermally opacifiable precursor glasses which consist essentially, expressed in weight percent on the oxide basis, of 5.5–15% $Li_2O$, 2–25% $Al_2O_3$, the ratio $Al_2O_3$:$Li_2O$ being less than about 1.7:1, 60–85% $SiO_2$, and a photosensitive metal in the indicated proportions selected from the group of 0.001–0.03% gold, computed as Au, 0.001–0.3% silver, computed as AgCl, and 0.001–1% copper, computed as $Cu_2O$, the sum of those components constituting at least 90% of the total composition.

The method for preparing a chemically sculptured, glass-ceramic article contemplates the following eight general steps:

(a) a batch falling within the above composition ranges is melted;

(b) the melt is simultaneously cooled to a glass and an article of a desired geometry shaped therefrom;

(c) the glass article is subjected to ultraviolet radiation to form a latent image therein; those portions of the article which are destined to be chemically removed are exposed to the radiation and remainder of the article is masked therefrom;

(d) the article is heated to a temperature between the annealing point and softening point of the glass for a time sufficient to opacify the glass via the formation of siliceous crystallites therein, including lithium metasilicate;

(e) the article is contacted with an aqueous hydrofluoric acid solution to etch away the lithium metasilicate crystals;

(f) the article is re-exposed to ultraviolet radiation;

(g) the article is reheated to a temperature between the annealing point and softening point of the glass for a time sufficient to opacify the glass via the formation of siliceous crystallites therein, including lithium metasilicate, in an amount sufficient to provide a crystalline structure which is rigid enough to prevent distortion of the article upon heating to the softening point of the original glass; and, finally, (h) the article is heated to a temperature above the softening point of the original glass and above 800° C., but not above 950° C., to cause further crystallization, including conversion of lithium metasilicate to a lithium-containing silicate having a lower weight percentage of lithium therein.

As can be observed from the above outline of method steps, the formation of a chemically sculptured glass-ceramic article requires a re-exposure to ultraviolet radiation and a second high temperature heat treatment. This latter heat treatment results in a highly crystalline body, the properties of which are more closely akin to the crystal phase present therein than to those of the parent glass. Moreover, the small amount of residual glass in the body will have a greatly different composition from that of the parent glass since the elements making up the crystals will have been removed therefrom. One very important mechanical advantage customarily possessed by a glass-ceramic with respect to the precursor glass therefor is a substantial improvement in strength. Also, the glass-ceramic has a higher use temperature than its parent glass.

It will be appreciated that where no chemical machining is undertaken, steps (d)–(f) will be omitted resulting in a single exposure to ultraviolet radiation and subsequent heat treatments.

Corning Glass Works, Corning, New York, has marketed products made in accordance within the disclosure of U.S. Pat. No. 2,971,853, supra, under the designation Code 8603. That product has the overall approximate composition recited below in terms of weight percent on the oxide basis, the photosensitive metals gold and silver being reported in elemental form:

$SiO_2$: 79.9
$Li_2O$: 9.4
$K_2O$: 4.0
$Al_2O_3$: 3.9
$Na_2O$: 1.5
ZnO: 1.0
$Sb_2O_3$: 0.4
$CeO_2$: 0.012
Ag: 0.12
Au: 0.0013.

Code 8603 articles can be chemically machined to fine tolerances to yield products of widely-varying conformations and configurations, thereby recommending their utility in such diverse applications as intaglio printing plates and spinnerets for the extrusion of synthetic fibers. In the information storage field, head pads or sliders which support the ferrite element that senses the data magnetically stored on information discs have been fashioned from Code 8063 material. A rather recent development in the design of such units was the introduction in 1973 of the Winchester Head by International Business Machines Corporation, Armonk, New York. This head has a geometry requiring close tolerances and the chemical machinability of Code 8603 has proven to be particularly useful in the fibrication of components therefor. A description of the Winchester Head is provided by Robert M. White in "Disk-Storage Technology", *Scientific American*, 243, No. 2, pages 142–143, August, 1980.

The storage discs consist of an aluminum metal substrate to which very finely-divided iron oxide particles are bonded utilizing an organic bond. Organic binders presently used include such thermoplastics as vinyl chloride/vinyl acetate copolymers, vinylidene chloride/acrylonitrile copolymers, butadiene/styrene rubber polymers, polyurethane elastomers, and epoxies. Also, some formulations include organic antistatic agents, stabilizers, and lubricants.

Unfortunately, considerable sticking has been experienced between the Code 8063 head pad and the coated aluminum storage disc. Examinations of the surfaces of the head pad and the storage disc have ascertained the presence of a substance on the disc surface believed to be the product of a reaction between the organic components of the disc and the humidity of the surrounding environment. No evidence has been found suggesting that the source of the reaction product is the Code 8063 material. In any event, the substance causes sticking between the head pad and storage disc which seriously impairs the operability of the mechanism. Yet, because of the ease of fabrication of the complex shapes required for head pads from Code 8603 material, an extensive search has been undertaken to devise means for preventing the sticking problem.

SUMMARY OF THE INVENTION

This invention is based upon the discovery that sticking between the Code 8603 head pad and the coated aluminum storage disc can be inhibited by treating the head pad in an atmosphere of $SO_2$ at about 350°–600° C. to cause the development of a water soluble deposit of $Li_2SO_3$ and/or $Li_2SO_4$ on the surface thereof. After removal of this deposit, sticking between the head pad and the storage disc does not take place. It will be appreciated that where $Na^+$ and/or $K^+$ ions are also present in the composition, as is the case with Code 8603, these ions will likewise react with the $SO_2$ vapors forming sulfites and/or sulfates and, hence, will be depleted from a surface layer on the article in like manner to the $Li^+$ ions.

U.S. Pat. No. 1,973,501 discloses means for improving the mechanical strength of soda lime glass articles by exposing those articles to temperatures at or somewhat below the softening point of the glass in an atmosphere containing vapors of $SO_2$ or $SO_3$. Those vapors react with the $Na_2O$ in the glass surface to form $Na_2SO_3$ or $Na_2SO_4$. The patent postulates that those compounds flux the glass surface slightly, thereby rounding off the minute flaws inherently present in the glass surface. This treatment has also been recognized as improving the chemical durability of alkali metal silicate glass via "dealkalizing" the surfaces thereof.

The mechanism by which the $SO_2$ treatment eliminates sticking between the head pad and the storage disc is not understood. Thus, if examination of the head pad showed the presence of a reaction product on the surface thereof, the assumption could logically be drawn that, because the dealkalization of the surface had removed the $Li^+$ ions from exposure to the ambient environment, reaction between those ions and the environment was prevented. Another apparent anomaly which has not been explained is the fact that, generally, bonding of substances to glasses is enhanced where the glass is free from or contains only a low content of alkali metal. For example, the preferred glasses for the reinforcement of cements and organic plastics and for thin film substrates are compositions of low alkali metal content. Consequently, the finding that dealkalization of the head pad surface eliminates sticking is contrary to the general norm.

The rate of reaction between the $SO_2$ vapors and the $Li^+$ ions present in the Code 8603 head pad is a function of temperature and the depth to which dealkalization proceeds is governed by the temperature and time of the exposure to the vapors. Thus, the rate of reaction is increased as the exposure temperature is raised. Although the glass-ceramic material can be exposed to temperature far in excess of 600° C. without manifesting thermal deformation, practical considerations recommend that 600° C. constitute a maximum reaction temperature. For example, the ferrite element is sealed to the glass-ceramic supporting member, a sealing frit being customarily utilized for that purpose. High temperature contact with $SO_2$ vapors hazards disintegration of the seal. Therefore, contact periods for as brief as one hour may be sufficient at 600° C. to generate a dealkalization layer having a depth of at least 50 microns (~0.002"), whereas exposure periods in excess of ten hours may be demanded at temperatures in the vicinity of 350° C. Longer reaction times can be safely employed but deeper layers of dealkalization do not appear to be necessary and longer periods of exposure are not commercially attractive. The most preferred practice contemplates temperatures between about 400°–500° C. for periods of about 4–8 hours.

RELATED APPLICATION

United States Application Ser. No. 223,580, STRENGTHENED TRANSPARENT GLASS-CERAMIC, PARTIALLY BODY-CRYSTALLIZED, AND SURFACE-CRYSTALLIZED GLASS ARTICLES, filed concurrently herewith in the names of Ronald L. Andrus and Richard F. Reade, discloses means for strengthening glass-ceramic articles, partially body-crystallized glass articles, and surface-crystallized glass articles wherein beta-quartz solid solution constitutes the predominant crystal phase. The articles do not utilize a photosensitive metal as a nucleating agent, but are simply thermally crystallizable, and are not chemically machinable. The inventive method disclosed involves contacting the precursor glass article to $SO_2$ vapors at elevated temperatures, removing the resulting water soluble compound deposited on the glass surface, and subsequently heat treating the glass article to cause crystallization in situ thereof. The inventive products can exhibit strength values several fold greater than articles not subjected to the $SO_2$ treatment prior to crystallization.

DESCRIPTION OF THE PREFERRED EMBODIMENT

Samples of Code 8603 glass-ceramic having a ferrite element sealed thereto via a commercial sealing frit were placed into a box furnace having an inside chamber consisting of a 1000 ml stainless steel beaker with a stainless steel lid equipped with a gas outlet pipe. The inlet for the $SO_2$ gas comprised a stainless steel tube wound around the outside of the beaker to facilitate obtaining thermal equilibrium of the gas before it was passed into the bottom of the reaction chamber. Experience demonstrated the oxidation products generated in this apparatus are sufficient to catalyze the reaction

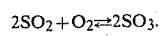

$$2SO_2 + O_2 \rightleftarrows 2SO_3.$$

The use of a ceramic reaction chamber or a larger volume, with accompanying lower surface area, stainless steel reaction chamber will require a platinum catalyst to promote that reaction.

A flow of $SO_2$ at a volume of 20 cc/minute plus air at 980 cc/minute was passed through distilled water held at a temperature of 95° C. The flow was continued for periods of five hours and seven and one-half hours each at temperatures of 400° and 500° C. The samples were then withdrawn from the reaction chamber, cooled to room temperature, rinsed in tap water to remove the sulfite and/or sulfate "bloom", and dried.

The specimens exposed to the 500° C. treatment evidenced some disintegration of the seal whereas no attack of the seal was visible in those samples reacted at 400° C. All of the specimens, however, exhibited no sticking to the storage disc.

It has been hypothesized that the overall result from the reaction of moist $SO_2$ and/or $SO_3$ with the glass-ceramic surface can be summed up as comprising a $H^+$-for-$Li^+$ ion exchange reaction on a one-for-one basis.

To investigate the possible efficacy of other ion exchange reactions in preparing the surface to avoid sticking, similar samples of Code 8603 glass-ceramic having a ferrite element attached thereto by means of the above-mentioned commercial sealing frit were immersed for seven and one-half hours into a bath of molten $KNO_3$ operating at 500° C. to cause the replacement of $Li^+$ ions in the sample surface with $K^+$ ions from the bath on a one-for-one basis. This treatment appeared to have no effect upon the sticking problem.

In summary, the $SO_2$ treatment of the photothermally crystallized glass-ceramic articles made from the glass compositions and in accordance with the method described in U.S. Pat. No. 2,971,853 will lead to the surface dealkalization thereof with elimination of sticking to the reaction products of moisture and organic materials. Corning Code 8603 constitutes the most preferred embodiment.

We claim:
1. A method for rendering a photothermally crystallizable, chemically-machinable, glass-ceramic article non-sticking with respect to the reaction products of moisture and organic materials, which comprises the steps of:
   (a) a batch is melted for a glass consisting essentially, expressed in weight percent on the oxide basis, of 5.5–15% $Li_2O$, 2–25% $Al_2O_3$, the ratio $Al_2O_3$:$Li_2O$ being less than about 1.7:1, 60–85% $SiO_2$, and a photosensitive metal in the indicated proportions selected from the group of 0.001–0.03% gold, computed as Au, 0.001–0.3% silver, computed as AgCl, and 0.001–1% copper, computed as $Cu_2O$, the sum of those components constituting at least 90% of the total composition;
   (b) the melt is simultaneously cooled to a glass and an article of desired geometry shaped therefrom;
   (c) the glass article is subjected to ultraviolet radiation to form a latent image in the glass;
   (d) the glass article is heated to a temperature between the annealing point and the softening point of the glass for a time sufficient to opacify the glass by forming siliceous crystallites therein, including lithium metasilicate, in an amount sufficient to provide a crystalline structure which is rigid enough to prevent distortion of the article upon heating to a softening point of the original glass;
   (e) the article is heated to a temperature above the softening point of the original glass and about 800° C., but not above 950° C., to cause further crystallization, including conversion of lithium metasilicate to a lithium-containing silicate having a lower weight percentage of lithium therein, thereby transforming the article to a glass-ceramic article;
   (f) exposing the glass-ceramic article to $SO_2$ vapors at a temperature between about 350°–600° C. for about 1–10 hours to cause a reaction to occur to a depth of at least 50 microns (~0.002") in the surface of the article between $Li^+$ ions and $SO_2$ vapors to form a water soluble deposit of $Li_2SO_3$ and/or $Li_2SO_4$ thereon; and
   (g) removing the deposit of $Li_2SO_3$ and/or $Li_2SO_4$ from the surface of the glass-ceramic article.

2. A method according to claim 1 wherein said glass-ceramic article is exposed to $SO_2$ vapors for about 4–8 hours at a temperature between about 400°–500° C.

3. A method according to claim 1 wherein said glass has the following approximate composition, expressed in weight percent on the oxide basis:
   $SiO_2$: 79.9
   $Li_2O$: 9.4
   $K_2O$: 4.0
   $Al_2O_3$: 3.9
   $Na_2O$: 1.5
   ZnO: 1.0
   $Sb_2O_3$: 0.4
   $CeO_2$: 0.012
   Ag: 0.12
   Au: 0.0013.

4. In a method for making a head pad for use in conjunction with an aluminum information storage disc coated with finely-divided iron oxide particles bonded to the surface thereof via an organic material, wherein said head pad comprises a photothermally crystallizable, chemically-machinable, glass-ceramic article consisting essentially, expressed in weight percent on the oxide basis, of 5.5–15% $Li_2O$, 2–25% $Al_2O_3$, the ratio $Al_2O_3$:$Li_2O$ being less than about 1.7:1, 60–85% $SiO_2$, and a photosensitive metal in the indicated proportions selected from the group of 0.001–0.03% gold, computed as Au, 0.001–0.3% silver, computed as AgCl, and 0.001–1% copper, computed as $Cu_2O$, the sum of those components constituting at least 90% of the total composition, the predominant crystal phase present therein being a lithium-containing silicate having a lower weight percentage of lithium therein than lithium metasilicate, the improvement which comprises making said head pad non-sticking with respect to said information storage disc by exposing said glass-ceramic article to $SO_2$ vapors at a temperature between about 350° C.–600° C. for about 1–10 hours to cause a reaction to occur to a depth of at least 50 microns (~0.002") in the surface of the article between $Li^+$ ions and $SO_2$ vapors to form a water soluble deposit of $Li_2SO_3$ and/or $Li_2SO_4$ thereon and then removing the deposit of $Li_2SO_3$ and/or $Li_2SO_4$ from the surface of the article.

5. A method according to claim 4 wherein said glass-ceramic article is exposed to $SO_2$ vapors for about 4–8 hours at a temperature between about 400°–500° C.

6. A method according to claim 4 wherein said glass-ceramic article has the following approximate composition, expressed in weight percent on the oxide basis:
   $SiO_2$: 79.9
   $Li_2O$: 9.4
   $K_2O$: 4.0
   $Al_2O_3$: 3.9
   $Na_2O$: 1.5
   ZnO: 1.0
   $Sb_2O_3$: 0.4
   $CeO_2$: 0.012
   Ag: 0.12
   Au: 0.0013.

* * * * *

UNITED STATES PATENT AND TRADEMARK OFFICE
CERTIFICATE OF CORRECTION

PATENT NO. : 4,328,305
DATED : May 4, 1982
INVENTOR(S) : Herbert E. Rauscher

It is certified that error appears in the above—identified patent and that said Letters Patent is hereby corrected as shown below:

Column 2, line 52, "8063" should read -- 8603 --.

Column 2, line 58, change "fibrication" to -- fabrication --.

Column 3, line 5, "8063" should read -- 8603 --.

Column 3, line 12, "8063" should read -- 8603 --.

Signed and Sealed this

Thirty-first Day of August 1982

[SEAL]

Attest:

Attesting Officer

GERALD J. MOSSINGHOFF

Commissioner of Patents and Trademarks